United States Patent
Meisenzahl (10) Patent No.: US 7,948,534 B2
(45) Date of Patent: May 24, 2011

(54) CHARGE-COUPLED DEVICE IMAGE SENSOR WITH VERTICAL BINNING OF SAME-COLOR PIXELS

(75) Inventor: Eric J. Meisenzahl, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 394 days.

(21) Appl. No.: 12/255,716

(22) Filed: Oct. 22, 2008

(65) Prior Publication Data

US 2010/0097505 A1    Apr. 22, 2010

(51) Int. Cl.
*H04N 3/14* (2006.01)
*H04N 5/535* (2006.01)
*H01L 29/66* (2006.01)

(52) U.S. Cl. ........ 348/273; 348/311; 348/297; 348/272; 348/303; 257/183.1

(58) Field of Classification Search .......... 348/302–309, 348/311, 317, 324, 294, 298, 299, 312, 314, 348/273; 257/215, 223, 183.1, 225
See application file for complete search history.

(56) References Cited

U.S. PATENT DOCUMENTS

| | | | |
|---|---|---|---|
| 3,971,065 A | 7/1976 | Bayer | |
| 4,839,734 A * | 6/1989 | Takemura | 348/317 |
| 4,996,600 A * | 2/1991 | Nishida et al. | 348/322 |
| 5,027,218 A * | 6/1991 | Ueda | 358/213.22 |
| 5,652,621 A | 7/1997 | Adams, Jr. et al. | |
| 6,469,290 B1 | 10/2002 | Suzuki | |
| 6,507,365 B1 | 1/2003 | Nakamura et al. | |
| 6,744,466 B1 | 6/2004 | Furumiya | |
| 7,002,630 B1 * | 2/2006 | Iizuka | 348/322 |
| 7,564,492 B2 * | 7/2009 | Nagayoshi et al. | 348/273 |
| 7,719,594 B2 * | 5/2010 | Kato et al. | 348/319 |
| 2003/0193580 A1 | 10/2003 | Okamoto | |
| 2005/0243195 A1 | 11/2005 | Parks | |
| 2005/0280726 A1 | 12/2005 | Parks et al. | |
| 2006/0007353 A1 | 1/2006 | Matsutani et al. | |
| 2006/0044441 A1 | 3/2006 | Parks | |
| 2006/0125943 A1 | 6/2006 | Parks | |
| 2006/0170799 A1 | 8/2006 | Meisenzahl et al. | |
| 2007/0024931 A1 | 2/2007 | Compton et al. | |
| 2007/0139545 A1 | 6/2007 | Parks | |
| 2007/0296051 A1 | 12/2007 | Meisenzahl | |
| 2008/0007622 A1 | 1/2008 | Meisenzahl | |
| 2008/0204585 A1 * | 8/2008 | Meisenzahl et al. | 348/303 |

FOREIGN PATENT DOCUMENTS

EP    0 936 806 A2    8/1999

* cited by examiner

*Primary Examiner* — Lin Ye
*Assistant Examiner* — Marly Camargo
(74) *Attorney, Agent, or Firm* — Nancy R. Simon (57) ABSTRACT

A CCD image sensor comprises photosensitive elements arranged in rows and columns, vertical CCDs each having vertical shift elements associated with respective ones of the photosensitive elements of a corresponding one of the columns, and a horizontal CCD comprising horizontal shift elements. The image sensor further comprises a transition region arranged between the vertical CCDs and the horizontal CCD. The transition region is configured to separate each of a plurality of signal channels provided by respective ones of the vertical CCDs into first and second parallel signal channels and to controllably direct selected ones of the parallel signal channels to the horizontal shift elements of the horizontal CCD in accordance with a designated readout sequence.

15 Claims, 7 Drawing Sheets

CHARGE-COUPLED DEVICE IMAGE SENSOR WITH VERTICAL BINNING OF SAME-COLOR PIXELS

FIELD OF THE INVENTION

The present invention relates generally to electronic image sensors for use in digital cameras and other types of imaging devices, and more particularly to charge-coupled device (CCD) image sensors.

BACKGROUND OF THE INVENTION

A typical electronic image sensor comprises a number of photodiodes or other photosensitive elements arranged in a two-dimensional array. These elements are also commonly referred to as picture elements or "pixels" and the corresponding array is referred to as a pixel array.

In order to allow such an image sensor to produce a color image, the image sensor is configured with color filter elements of a color filter array (CFA) arranged over respective ones of the pixels. One commonly used type of CFA pattern is the Bayer pattern, disclosed in U.S. Pat. No. 3,971,065, entitled "Color Imaging Array," which is incorporated by reference herein. The Bayer CFA pattern provides each pixel with a color photoresponse exhibiting a predominant sensitivity to one of three designated portions of the visible spectrum. The three designated portions may be, for example, red, green and blue, or cyan, magenta and yellow. A given CFA pattern is generally characterized by a minimal repeating unit in the form of a subarray of contiguous pixels that acts as a basic building block for the pattern. Multiple copies of the minimal repeating unit are juxtaposed to form the complete pattern.

An image captured using an image sensor with a Bayer CFA pattern has only one color value at each pixel. Therefore, in order to produce a fill color image, the missing color values at each pixel are interpolated from the color values of nearby pixels. Numerous such interpolation techniques are known in the art. See, for example, U.S. Pat. No. 5,652,621, entitled "Adaptive Color Plane Interpolation in Single Sensor Color Electronic Camera," which is incorporated by reference herein.

In a CCD image sensor, vertical and horizontal CCDs are used to transfer collected charge from the photodiodes or other photosensitive elements of the pixel array. The collected charge from one photosensitive element for a given image capture period is often referred to as a charge packet. A typical CCD image sensor configuration includes a separate vertical CCD (VCCD) for each column of pixels, and at least one horizontal CCD (HCCD) coupled to outputs of the VCCDs. Each VCCD is configured as a shift register having shift elements associated with the respective photosensitive elements of its corresponding column of the pixel array. Outputs of the VCCDs are coupled to respective shift elements of the HCCD. Readout of the pixel array in this type of configuration generally involves shifting charge packets vertically through the VCCDs and into the HCCD, and then shifting the charge packets horizontally through the HCCD to an output amplifier. Often, multi-phase CCD structures are used for the VCCDs and HCCDs in a CCD image sensor. In such an arrangement, shift elements of the VCCD or HCCD are each separated into multiple parts or "phases" to facilitate the transfer of charge packets through these structures.

It is known to combine charge packets from neighboring pixels having the same color filter elements in order to reduce the total number of charge packets. This "color binning" results in reduced image resolution but allows faster image readout. Examples of color binning techniques are disclosed in U.S. Patent Application Publication Nos. 2005/0243195, 2005/0280726, 2006/0044441, 2006/0125943, and 2007/0139545, all of which are commonly assigned herewith and incorporated by reference herein.

Despite the considerable advances provided by the color binning techniques described in the above-cited references, a need remains for further improvements, particularly in terms of color binning for CCD image sensors having Bayer CFA patterns or other types of CFA patterns.

SUMMARY OF THE INVENTION

Illustrative embodiments of the invention provide CCD image sensors having VCCD and HCCD structures that facilitate binning of same-color pixels for a wide variety of CFA patterns, including Bayer CFA patterns and other common CFA patterns.

In accordance with one aspect of the invention, a CCD image sensor comprises photodiodes or other photosensitive elements arranged in rows and columns, VCCDs each having vertical shift elements associated with respective ones of the photosensitive elements of a corresponding one of the columns, and an HCCD comprising horizontal shift elements. The image sensor further comprises a transition region arranged between the VCCDs and the HCCD. The transition region is configured to separate each of a plurality of signal channels provided by respective ones of the VCCDs into first and second parallel signal channels and to controllably direct selected ones of the parallel signal channels to the horizontal shift elements of the HCCD in accordance with a designated readout sequence.

The transition region may comprise a plurality of transition region shift elements including first, second and third rows of gates. The gates in the first row of gates may be configured to receive charge packets from the VCCDs and to direct the charge packets from the VCCDs into selected ones of the first and second parallel signal channels responsive to one or more applied control signals. The gates in the second row of gates receive charge packets from the gates in the first row of gates and are each configured to store two different received charge packets in respective ones of the first and second parallel signal channels. The gates in the third row of gates receive charge packets from the gates in the second row of gates and direct the charge packets received from the second row of gates into corresponding ones of the horizontal shift elements of the HCCD.

In an illustrative embodiment in which the photosensitive elements are configured in accordance with a Bayer CFA pattern, first and second parallel signal channels of the transition region corresponding to a first one of the VCCDs are configured to provide vertical binning of charge packets for pairs of green pixels of a first one of the columns and vertical binning of charge packets for pairs of blue pixels of that same column. Similarly, first and second parallel signal channels of the transition region corresponding to a second one of the VCCDs are configured to provide vertical binning of charge packets for pairs of green pixels of a second one of the columns and vertical binning of charge packets for pairs of red pixels of that same column.

An image sensor in accordance with the invention may be advantageously implemented in a digital camera or other type of imaging device. The illustrative embodiments provide a variable resolution image sensor that provides efficient on-chip vertical binning. In one such embodiment, image resolution is reduced by a factor of two by vertically combining pairs of charge packets for same-color pixels into respective single charge packets. This provides nearly a factor of two increase in the image readout or frame rate. Also, signal-to-noise ratio (SNR) is improved, which results in better performance, particularly under low light conditions.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

The present invention will be illustrated herein in conjunction with particular embodiments of digital cameras, image sensors and associated readout processes. It should be understood, however, that these illustrative arrangements are presented by way of example only, and should not be viewed as limiting the scope of the invention in any way. Those skilled in the art will recognize that the disclosed arrangements can be adapted in a straightforward manner for use with a wide variety of other types of imaging devices, image sensors and associated readout processes.

Figure 1:
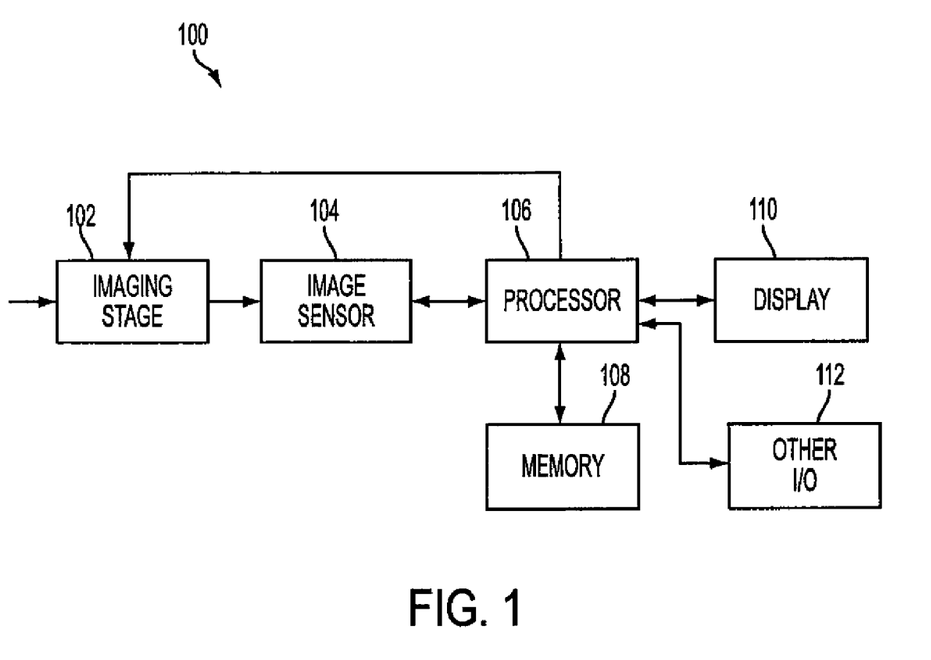
FIG. 1 is a block diagram of a digital camera having a CCD image sensor configured in accordance with an illustrative embodiment of the invention.

FIG. 1 shows a digital camera 100 in an illustrative embodiment of the invention. In the digital camera, light from a subject scene is input to an imaging stage 102. The imaging stage may comprise conventional elements such as a lens, a neutral density filter, an iris and a shutter. The light is focused by the imaging stage 102 to form an image on an image sensor 104, which converts the incident light to electrical signals. The digital camera 100 further includes a processor 106, a memory 108, a display 110, and one or more additional input/output (I/O) elements 112.

Although shown as separate elements in the embodiment of FIG. 1, the imaging stage 102 may be integrated with the image sensor 104, and possibly one or more additional elements of the digital camera 100, to form a compact camera module.

The image sensor 104 is a CCD image sensor. The image sensor generally comprises a pixel array having a plurality of pixels arranged in rows and columns and may include additional circuitry associated with readout of the pixel array. This additional circuitry may comprise, for example, an analog signal processor for processing analog signals read out from the pixel array and an analog-to-digital converter for converting such signals to a digital form. These and other types of circuitry suitable for use in the digital camera 100 are well known to those skilled in the art and will therefore not be described in detail herein. Portions of the readout circuitry may be arranged external to the image sensor, or formed integrally with the pixel array, for example, on a common integrated circuit with photosensitive elements and other elements of the pixel array. Circuitry that is formed integrally with the pixel array on a common integrated circuit is referred to herein as "on-chip" circuitry.

The image sensor 104 will typically be implemented as a color image sensor having an associated CFA pattern. An example of a CFA pattern that may be used in the image sensor 104 is the Bayer pattern disclosed in the above-cited U.S. Pat. No. 3,971,065, although other CFA patterns may be used. Other examples of CFA patterns that may be used with the image sensor 104 include those described U.S. Patent Application Publication No. 2007/0024931, entitled "Image Sensor with Improved Light Sensitivity," which is incorporated by reference herein. These include patterns which provide certain of the pixels with a panchromatic photoresponse. Such patterns are also generally referred to herein as "sparse" CFA patterns.

The processor 106 of digital camera 100 may comprise, for example, a microprocessor, a central processing unit (CPU), an application-specific integrated circuit (ASIC), a digital signal processor (DSP), or other processing device, or combinations of multiple such devices. Various elements of the imaging stage 102 and the image sensor 104 may be controlled by timing signals or other signals supplied from the processor 106.

The memory 108 may comprise any type of memory, such as, for example, random access memory (RAM), read-only memory (ROM), Flash memory, disk-based memory, removable memory, or other types of storage elements, in any combination.

Functionality associated with readout of the pixel array and the processing of corresponding image data may be implemented at least in part in the form of software that is stored in memory 108 and executed by processor 106.

A given image captured by the image sensor 104 may be stored by the processor 106 in memory 108 and presented on display 110. The display 110 is typically an active matrix color liquid crystal display (LCD), although other types of displays may be used. The additional I/O elements 112 may comprise, for example, various on-screen controls, buttons or other user interfaces, network interfaces, memory card interfaces, etc.

Additional details regarding the operation of a digital camera of the type shown in FIG. 1 can be found, for example, in the above-cited U.S. Patent Application Publication No. 2007/0024931.

It is to be appreciated that the digital camera as shown in FIG. 1 may comprise additional or alternative elements of a type known to those skilled in the art. Elements not specifically shown or described herein may be selected from those known in the art. As noted previously, the present invention may be implemented in a wide variety of other types of digital cameras or imaging devices. Also, as mentioned above, certain aspects of the embodiments described herein may be implemented at least in part in the form of software executed by one or more processing elements of an imaging device. Such software can be implemented in a straightforward manner given the teachings provided herein, as will be appreciated by those skilled in the art.

The image sensor 104 will now be described in greater detail with reference to FIGS. 2 through 6. It should be noted that the image sensor figures are simplified in order to clearly illustrate various aspects of the present invention, and are not necessarily drawn to scale. For example, these figures show a relatively small number of pixels, while in practice a given image sensor will typically include a much larger number of pixels. A given embodiment may include a variety of other features or elements that are not explicitly illustrated but would be familiar to one skilled in the art as being commonly associated with image sensors of the general type described.

Figure 2:
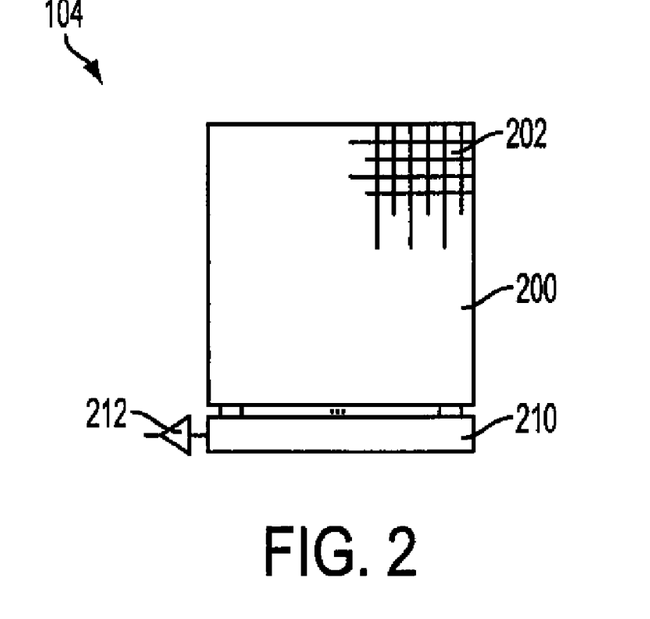
FIG. 2 shows the image sensor implemented in the digital camera of FIG. 1.

Referring now to FIG. 2, image sensor 104 includes a pixel array 200 comprising a plurality of photosensitive elements 202 arranged in rows and columns. The photosensitive elements 202 may comprise, for example, photodiodes or photocapacitors. The image sensor further comprises a horizontal CCD (HCCD) 210 and an output amplifier 212. Although not explicitly illustrated in the figure, vertical CCDs (VCCDs) are integrated into pixel array 200 with the photosensitive elements 202. The HCCD and the VCCDs are each typically implemented as a shift register comprising a plurality of shift elements. The HCCD and VCCD structures will be described in greater detail in conjunction with FIG. 4.

Figure 3:
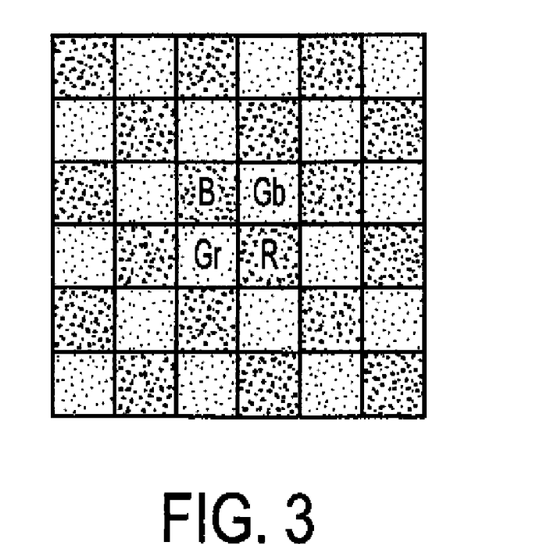
FIG. 3 shows a Bayer CFA pattern utilized in the image sensor of FIG. 2.

FIG. 3 shows the Bayer CFA pattern that is assumed to be implemented in the image sensor 104 in the present embodiment. The minimal repeating unit in this CFA pattern includes four contiguous pixels: one red (R), two green (G) and one blue (B). The green pixels that share a row with red pixels are more particularly denoted Gr, and the green pixels that share a row with blue pixels are more particularly denoted Gb.

Figure 4:
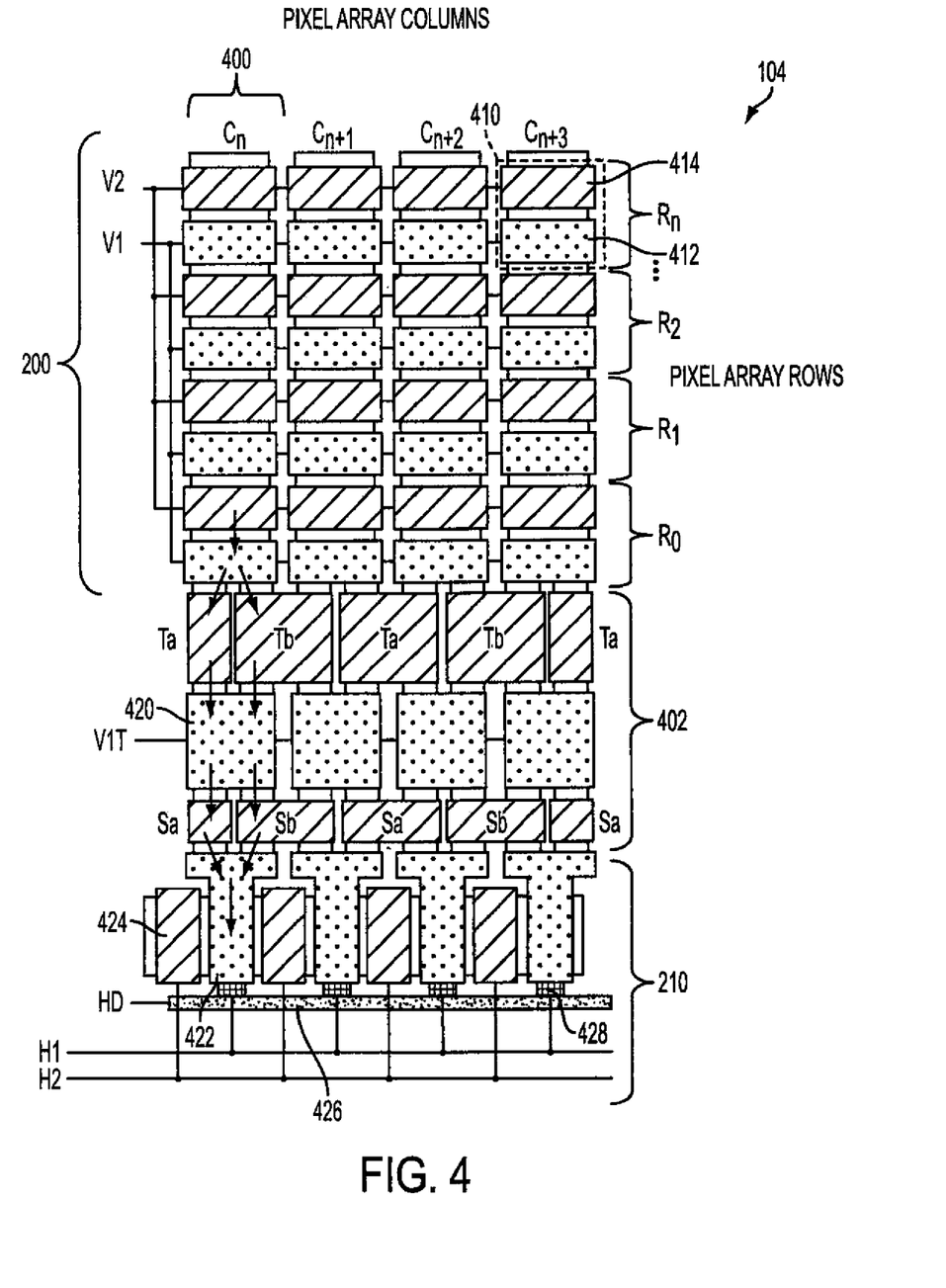
FIG. 4 is a more detailed view of the image sensor of FIG. 2 illustrating its VCCD and HCCD structures.

FIG. 4 is a more detailed view of the image sensor 104 showing the configuration of the VCCD and HCCD structures. This embodiment advantageously allows on-chip combining or binning of same-color pixels in the vertical direction. Each column of the pixel array 200 includes a VCCD 400 which provides a signal channel for transfer of charge packets from the pixels of that column to the HCCD 210. The image sensor further includes a transition region 402 arranged between the VCCDs 400 of the pixel array 200 and the HCCD 210. The VCCDs and HCCD generally operate as shift registers, as will be described below. The transition region 402 is configured to separate each of a plurality of signal channels provided by respective ones of the VCCDs into first and second parallel signal channels and to controllably direct selected ones of the parallel signal channels to horizontal shift elements of the HCCD in accordance with a designated readout sequence. An example of such a readout sequence will be described in conjunction with FIGS. 5 and 6.

The portion of the pixel array 200 shown in FIG. 4 includes pixels arranged in rows and columns. The rows are denoted $R_0$ through $R_n$, and the four columns that are shown are denoted $C_n$, $C_{n+1}$, $C_{n+2}$ and $C_{n+3}$. A given column of the pixel array more particularly includes a corresponding VCCD 400 in the form of a shift register comprising vertical shift elements 410 associated with respective ones of the photosensitive elements of that column. The vertical shift elements may be integrated within, coupled to, or otherwise associated with the respective photosensitive elements. For example, a given VCCD may combine photosensing and charge transport functionality, as is well known. Thus, the photosensitive elements may be implemented integrally with the vertical shift elements of the VCCDs. Numerous alternative arrangements are possible.

In this embodiment, the VCCDs are assumed to be true two-phase VCCDs, such that each vertical shift element further comprises a first phase shift element 412 and a second phase shift element 414. Other embodiments can utilize single-phase VCCDs or VCCDs having more than two phases.

The image sensor 104 as shown in FIG. 4 includes only 16 pixels, for clarity and simplicity of illustration, although as indicated previously a typical practical implementation will include many more pixels configured in a manner similar to those shown in the figure.

The exemplary image sensor arrangement shown in FIG. 4 is configured for combination or binning of same-color pixels in the vertical direction only. Alternative embodiments may vary the configuration of the HCCD 210 in order to allow for horizontal combination of pixels also. This may involve, for example, the use of an additional on-chip HCCD structure, or off-chip signal combining circuitry not integrated with the pixel array into a common integrated circuit. These and other HCCD structures utilizable with the present invention are well understood by those skilled in the art, and accordingly will not be described in detail herein.

The VCCDs 400 in the illustrative embodiment of FIG. 4 are assumed without limitation to comprise typical N-type buried channel CCD structures formed on a p-type substrate. In such an arrangement, the first and second phase shift elements 412 and 414 may correspond to respective metal-oxide-semiconductor (MOS) gates. Each of the VCCDs 400 of pixel array 200 is thus configured in this embodiment as a true two-phase CCD shift register with two gates per pixel.

The first phase shift elements 412 of the pixel array 200 are controlled by a control line denoted V1 and the second phase shift elements 414 of the pixel array 200 are controlled by a control line denoted V2. When a control signal applied to the V1 or V2 control line is at a logic low level, electronic charge tends to be pushed out of the associated MOS gates. When a control signal applied to the V1 or V2 control line is at a logic high level, electronic charge tends to collect underneath the associated MOS gates. Each of the MOS gates typically comprises a barrier region that includes an implant, under only a portion of the gate, used for pixel isolation and charge transfer. These barrier region and implant elements are not explicitly shown in the figure, but are well known to those skilled in the art. Also omitted from the figure for clarity and simplicity of illustration are other types of conventional elements that may be included in a given embodiment of the pixel array, such as pixel overflow drains for blooming control and pulse flush gates for pixel reset.

The transition region 402 also includes a plurality of shift elements. These include shift elements denoted Ta, Tb, Sa and Sb, as well as additional shift elements 420. The shift elements 420 are controlled by a control line denoted V1T. Each of these shift elements, like the shift elements 412 and 414, will typically comprise a MOS gate, configured in a well-known manner to include the above-noted barrier region and implant.

The MOS gates controlled by the V1, V2 and V1T control lines are also referred to herein as V1 gates, V2 gates and V1T gates, respectively. The MOS gates associated with the Ta, Tb, Sa and Sb shift elements are also referred to herein as Ta gates, Tb gates, Sa gates and Sb gates, respectively.

The channel potentials of the barrier regions within the V1 and V1T gates are deeper than those within the V2, Ta, Tb, Sa and Sb gates for the same applied voltage. This arrangement, for example, facilitates the sharing of charge in a given pixel between its associated V1 and V2 gates without leaking over to an adjacent pixel.

The VCCDs 400 of the pixel array 200 transfer rows of charge packets into the transition region 402. Each of the VCCDs generally provides a signal channel for transfer of charge packets within the corresponding column $C_n$, $C_{n+1}$, etc. A given such signal channel is subsequently split into two separate and isolated signal channels for each column within the transition region 402. These two separate and isolated signal channels are examples of what are more generally referred to herein as first and second "parallel" signal channels. As noted above, the transition region includes the Ta, Tb, V1T, Sa and Sb gates. The Ta and Tb gates determine whether a particular row of charge packets is guided into the left or right half of the split signal channel. Likewise, the Sa and Sb gates determine whether charge packets in the left or right half of the split signal channel are released into the HCCD 210. The shift elements 420 controlled by respective ones of the V1T gates can each hold two distinct charge packets within a single column. Because the width of the signal channel is reduced in these elements, the lengths of the Ta, Tb and V1T gates are elongated to match the charge holding capacity of a given pair of the V1 and V2 gates.

Control lines for the Ta and Sa gates are assumed to be electrically connected to one another on-chip in the FIG. 4 embodiment, although this connection is not explicitly shown in the figure. Likewise, Tb and Sb control lines are electrically connected to one another, and V1 and V1T control lines are electrically connected to one another. Thus, the use of the transition region 402 configured as shown in FIG. 4 requires only two additional control signals, one for the common control lines for the Ta and Sa gates, and another for the common control lines for the Tb and Sb gates.

The HCCD 210 comprises a horizontal shift register configured for two-phase operation. Each horizontal shift element coupled to a given column of the pixel array comprises a first phase shift element 422 and a second phase shift element 424. The first phase shift elements 422 receive charge packets from the Sa and Sb gates of the transition region 402. Other embodiments can utilize single-phase HCCDs or HCCDs having more than two phases.

Like the corresponding elements of the VCCD, the first and second phase shift elements 422 and 424 of the HCCD may correspond to respective MOS gates. The first phase shift elements 422 of the HCCD are controlled by a first common control line H1 and the second phase shift elements 424 of the HCCD are controlled by a second common control line H2. The MOS gates associated with the shift elements 422 and 424 are also referred to H1 gates and H2 gates, respectively. Each of the H1 and H2 gates, like those of the VCCDs 400 and transition region 402, typically comprises a barrier region that includes an implant.

The HCCD 210 further comprises an overflow drain 426 for blooming control. This overflow drain is coupled to each of the H1 gates via respective overflow channels 428. A control line HD is coupled to the overflow drain 426. The overflow channels 428 may be formed by barrier implants within respective extended regions of the respective H1 gates. These and other elements of the HCCD 210 can be configured in a well-known conventional manner.

An exemplary readout process for the image sensor 104 as shown in FIG. 4 will now be described with reference to the timing diagram of FIG. 5 and the diagrams shown in FIGS. 6A-6C. The diagrams shown in FIGS. 6A-6C illustrate the same portion of the FIG. 4 image sensor at different points in time denoted p0 through p5 and t0 through t12. These points in time are indicated by respective vertical dashed lines in the FIG. 5 timing diagram.

Figure 5:
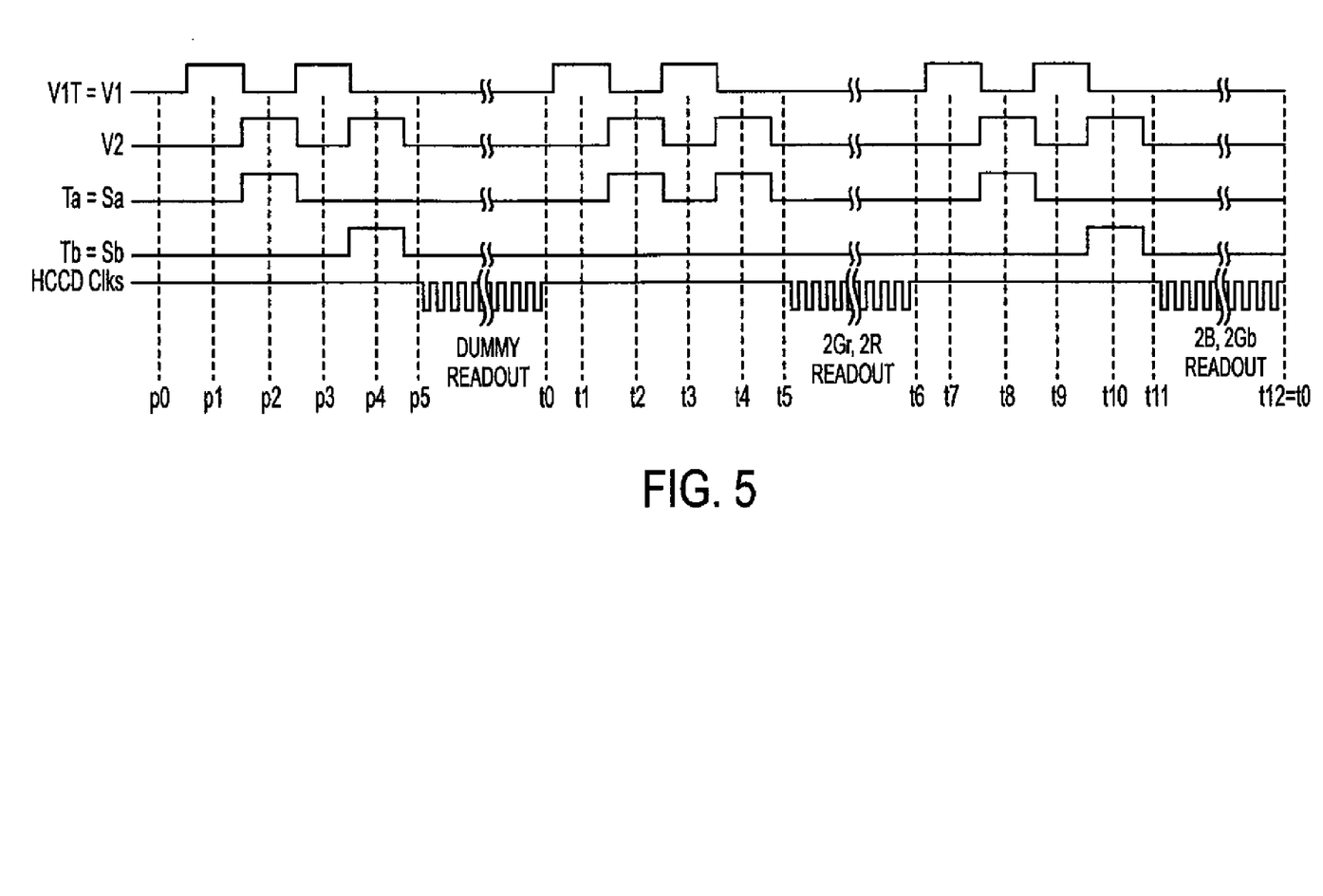
FIG. 5 is a timing diagram of a readout process for the image sensor as shown in FIG. 4.
Figure 6A:
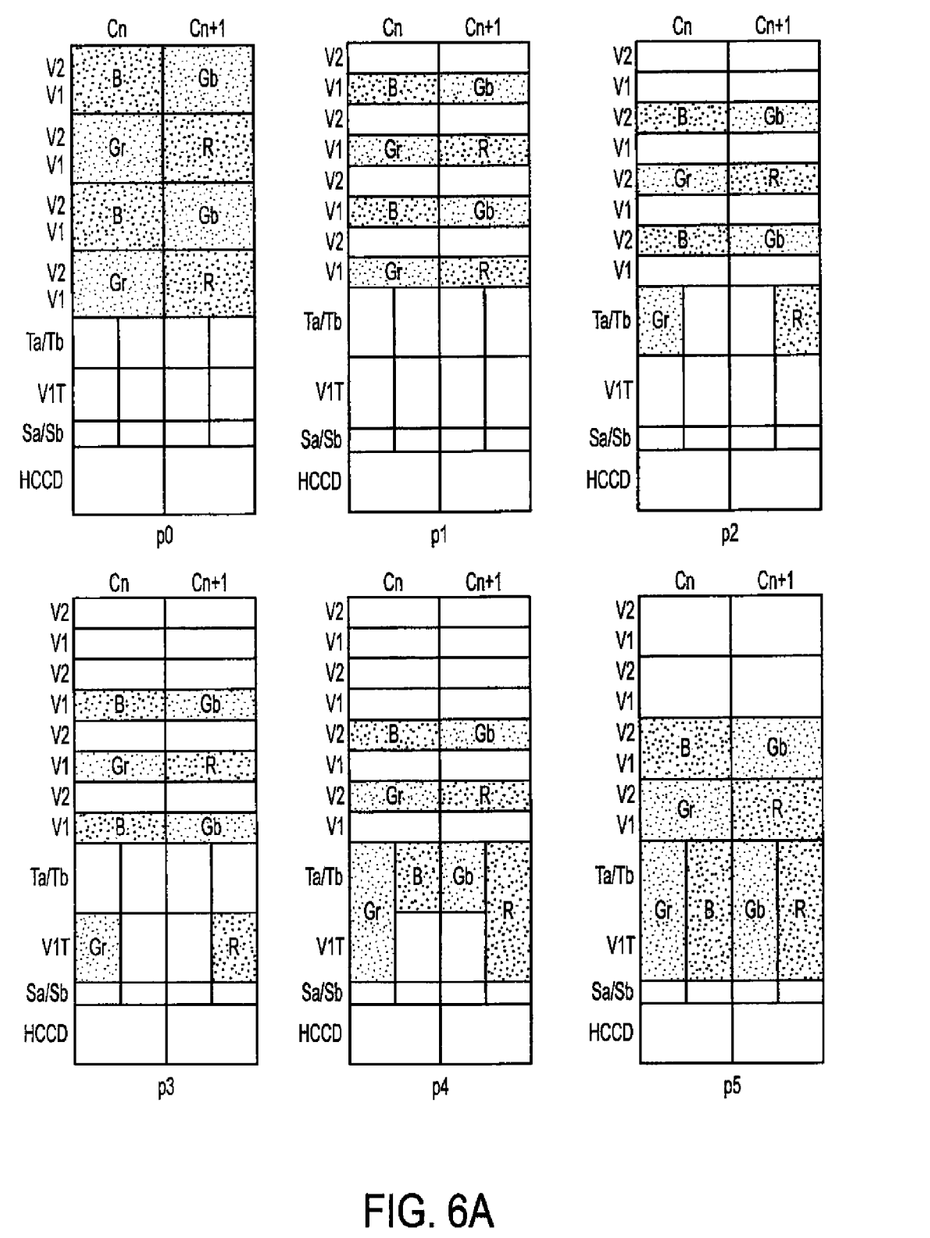
FIGS. 6A-6C are diagrams illustrating the movement of charge packets in the FIG. 4 image sensor at various points in time specified in the FIG. 5 timing diagram.
Figure 6B:
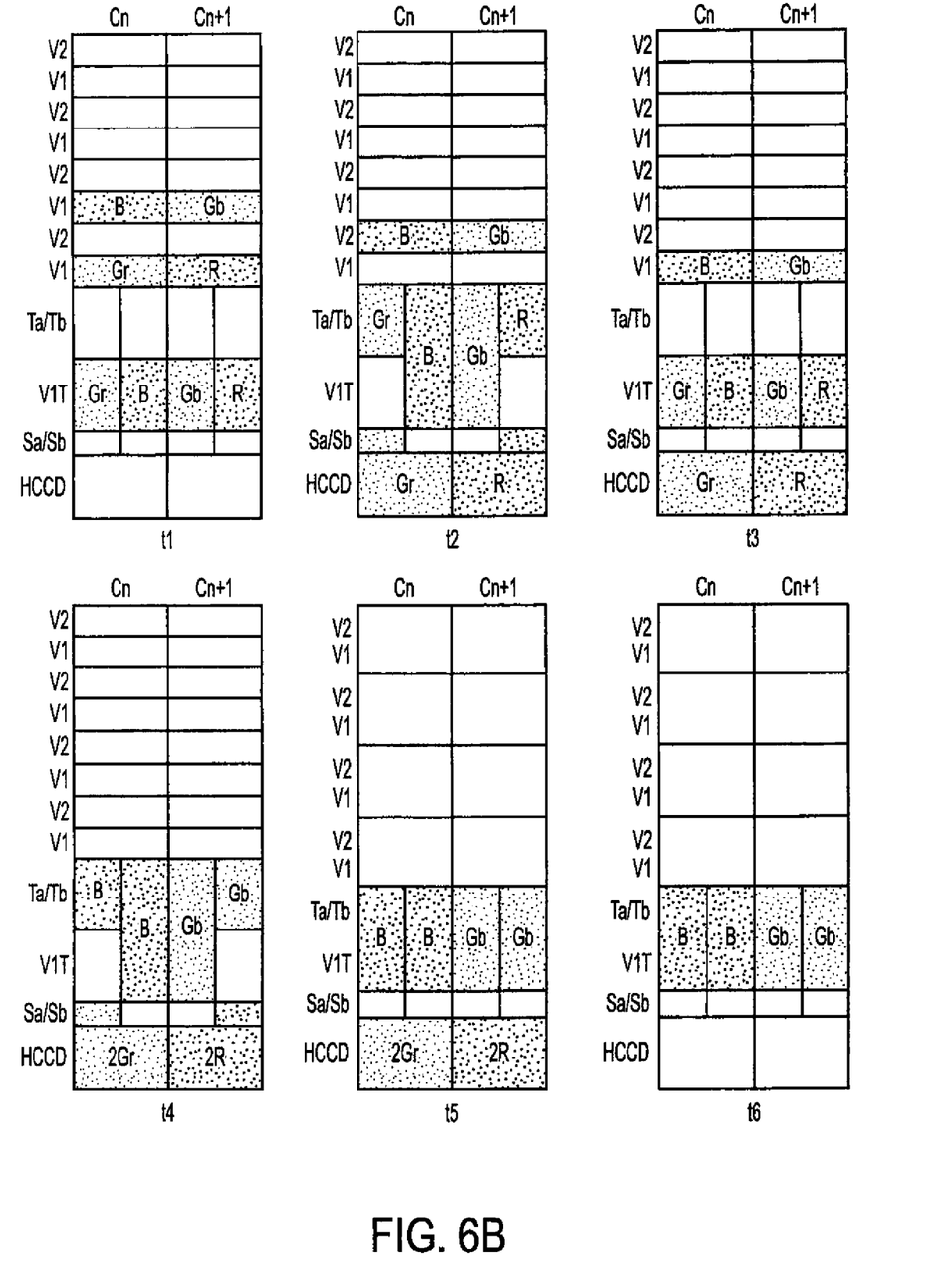
Figure 6C:
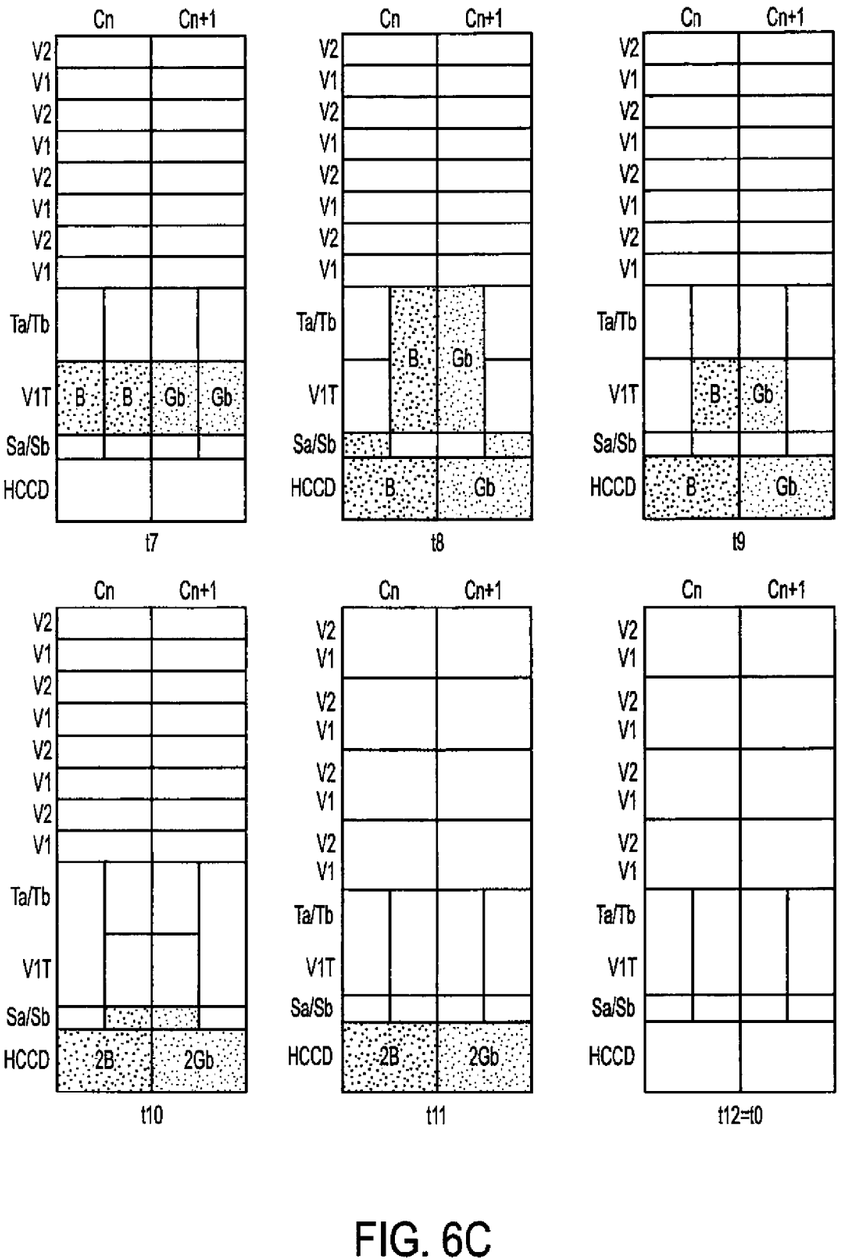

The timing diagram of FIG. 5 shows control signals applied to the control lines for the V1, V2, V1T, Ta, Tb, Sa and Sb gates, as well as clock signals used to provide two-phase clocking of the HCCD 210. It was noted above that the V1 and V1T gates share common control lines, as do the Ta and Sa gates, and the Tb and Sb gates. Thus, in the figure, four gate control signals are shown, denoted V1T=V1, V2, Ta=Sa, and Tb=Sb. It is assumed that when a given such signal is at a logic high level, any gates which receive that signal are in an on state. Similarly, when a given control signal is at a logic low level, any gates which receive that signal are in an off state. This assumes use of N-type MOS gates in the CCD structures. Alternative embodiments may utilize P-type MOS gates in the CCD structures, in which case the control signal polarities are reversed, that is, logic low level signals turn the gates on, while logic high level signals turn the gates off.

The portion of the image sensor shown in the FIGS. 6A-6C diagrams is an eight-pixel portion of the image sensor, which corresponds to the left half, or columns $C_n$ and $C_{n+1}$, of the 16-pixel portion shown in FIG. 4. This eight-pixel portion comprises two 2×2 blocks of pixels, also referred to below as an upper 2×2 block and a lower 2×2 block, each configured in accordance with the minimal repeating unit of the Bayer CFA pattern shown in FIG. 3. Thus, the eight-pixel portion comprises two Gr pixels, two Gb pixels, two R pixels and two B pixels.

At time p0, light incident on the image sensor 104 has been integrated in the photosensitive elements 202 to form respective charge packets. As indicated previously herein, collected charge from one photosensitive element for a given image capture period is referred to as a charge packet. The p0 diagram in FIG. 6A shows the charge packets for the upper and lower 2×2 blocks of pixels. The image capture period is also referred to herein as an integration period. Upon completion of the integration period, the charge packet for a given pixel is shared between the V1 and V2 gates of that pixel as shown.

As will be described, the readout process shown in FIGS. 5 and 6 combines or bins pairs of same-color pixels, that is, combines the charge packets for the two Gr pixels into a single charge packet, combines the charge packets for the two Gb pixels into a single charge packet, combines the charge packets for the two R pixels into a single charge packet, and combines the charge packets for the two B pixels into a single charge packet. This combination of same-color pixels occurs vertically using the VCCD and HCCD structures of FIG. 4. As a result of the combination, only four charge packets are read out for each group of eight pixels of the pixel array. Image resolution is reduced by a factor of two, but image readout speed is increased by nearly a factor of two. The increase in image readout speed is slightly less than a factor of two due to the overhead time associated with clocking two rows together prior to reading out the combined charge packets from the HCCD.

The charge packets for the eight-pixel portion of the pixel array are also referred to herein by line. More specifically, the lower 2×2 block includes a first line of Gr and R charge packets and a first line of B and Gb charge packets. The upper 2×2 block includes a second line of Gr and R charge packets and a second line of B and Gb charge packets.

The times p0 through p5 are part of a one-time preload period immediately following the integration period. This is followed by an optional dummy readout period. The times t0 through t12 illustrate a repeating pattern for reading out the pixels of the array. Only one diagram is shown in FIGS. 6B-6C for times t0 and t12 as the readout process repeats itself starting with t12. This single diagram is labeled t12=t0 in FIG. 6C.

During the portion of the preload period that includes times p1 through p5, the eight original charge packets shown at time p0 are shifted vertically through the V1 and V2 gates of the VCCDs 400 and the Ta, Tb and V1T gates of the transition region 402. The charge packets of the lower 2×2 block are transferred into the transition region 402 by alternately routing the charge packets into one side of a signal channel using gate Ta, as indicated in the p2 diagram, or the other side of the signal channel using gate Tb, as indicated in the p4 diagram.

It can be seen from the p4 diagram that each of the Gr and R charge packets of the lower 2×2 block is now shared among corresponding Ta and V1T gates. This is because the V1T gate has turned off while the Sa gate is also off, leading some amount of charge to transfer backwards and be shared among the Ta and V1T gates.

The preload period is completed at p5 with the charge packets arranged as shown in the p5 diagram. It can be seen from the p5 diagram that each of the B and Gb charge packets of the lower 2×2 block is now shared among corresponding Tb and V1T gates. Again, this is because the V1T gate has turned off while the Sa gate is also off, leading some amount of charge to transfer backwards and be shared among the Tb and V1T gates. The charge packets of the upper 2×2 block have been shifted to occupy respective positions that were occupied by those of the lower 2×2 block at time p0.

At this point, a dummy readout of the HCCD 210 is performed as shown in the timing diagram of FIG. 5. This is a dummy readout because the HCCD does not yet contain any charge packets. Such a dummy readout is useful in order to maintain consistent line times with subsequent pattern readouts, but can be eliminated in other embodiments of the invention.

After completion of the preload and dummy readout periods, binning and readout of the Gr and R pixels proceeds as shown in the t1 through t6 diagrams of FIG. 6B. This involves combining the two Gr charge packets vertically into a single charge packet 2Gr and combining the two R charge packets vertically into a single charge packet 2R. This process begins by turning on the V1 and V1T gates, which moves the charge packets from their respective shared positions in the p5 diagram down into the V1 or V1T gates as shown in the t1 diagram. Next, the Sa and V2 gates turn on which transfers the first line of Gr and R charge packets into the HCCD 210 while, at the same time.

Because the V1T gates have turned off and the Sb gates are also off, the first line of B and Gb charge packets in the transition region is held back under the shared space of the V1T and Tb gates. This also allows the second line of Gr and R charge packets to enter the transition region beside the held back first line of B and Gb charge packets.

At time t3, all charge packets are advanced downward by turning on the V1 and V1T gates while the first line of Gr and R charge packets is held in the HCCD 210.

At time t4, the V2, Ta and Sa gates are turned on, which combines the two vertically adjacent lines of Gr and R charge packets in the HCCD 210 while the first line of B and Gb charge packets is again held back in the transition region. Also, the second line of B and Gb charge packets is loaded adjacent to the first line of B and Gb charge packets within the split channel transition region.

At time t5, the V1T, Ta and Sa gates are turned off, which results in sharing of the second line of B and Sb charge packets among the Ta and V1T gates as shown.

The binned 2Gr and 2R charge packets are then read out from the HCCD 210 using standard two-phase readout. This part of the process is completed at time t6.

The binning and readout of the B and Gb pixels then proceeds as shown in the t7 through t12 diagrams of FIG. 6C. This involves combining the two B charge packets vertically into a single charge packet 2B and combining the two Gb charge packets vertically into a single charge packet 2Gb. This part of the process begins by turning on the V1 and V1T gates, which moves the charge packets from their respective shared positions in the t6 diagram down into the V1T gates as shown in the t7 diagram.

At time t8, the V2 and Sa gates are turned on which transfers the first line of B and Gb charge packets into the HCCD 210. Because the V1T gates have turned off and the Sb gates are also off, the second line of B and Gb charge packets in the transition region is held back under the shared space of the V1T and Tb gates. It is arbitrary which of the two lines of B and Gb charge packets is transferred first into the HCCD, as both are in the transition region. In this embodiment, it is assumed that the first line is transferred first.

At time t9, the second line of B and Gb charge packets is advanced downward by the V1T gates being turned on while the first line of B and Gb charge packets is held in the HCCD 210.

At time t10, the V2 and Sb gates are turned on, which combines the two vertically adjacent lines of B and Gb charge packets in the HCCD 210.

The binned 2B and 2Gb charge packets are then read out from the HCCD 210 using standard two-phase readout. This part of the process is completed at time t12.

The readout process described above can be extended in a straightforward manner to readout of additional pixels. For example, if additional lines of pixels were being used, the t12 diagram in FIG. 6C would look the same as the p5 diagram, and the readout process for times t0 through t12 would be repeated.

The above-described illustrative embodiments considerably facilitate the on-chip vertical binning of same-color pixels. As mentioned previously, the image resolution has been reduced by a factor of two by combining pairs of charge packets for vertically-adjacent same-color pixels into respective single charge packets. The image readout or frame rate is increased by nearly a factor of two due to the fact that the HCCD is cleared only once for every two rows in the pixel array. Also, signal-to-noise ratio (SNR) is improved, which results in better performance, particularly under low light conditions.

It should be further noted that the image sensor 104 may operate in a full resolution mode by connecting the Sa and Ta control line to the V2 control line while holding the Sb and Tb control line in an off state and using conventional pixel array timing.

Although illustrated with reference to a particular exemplary readout process, the image sensor 104 may be utilized with a wide variety of other readout processes. For example, numerous alternative forms of pixel binning are possible through appropriate modification of the control signals and readout sequence.

Also, the particular CFA pattern used in the illustrative embodiments is merely an example. Other types of CFA patterns may be used, including sparse CFA patterns such as the panchromatic checkerboard patterns disclosed in the above-cited U.S. Patent Application Publication No. 2007/0024931.

The invention has been described in detail with particular reference to certain illustrative embodiments thereof, but it will be understood that variations and modifications can be effected within the scope of the invention as set forth in the appended claims. For example, the invention can be implemented in other types of image sensors and digital imaging devices, using alternative VCCD, HCCD and transition region structures. The particular structures used may include single-phase structures, or two-phase, pseudo-two-phase or other types of multi-phase structures, in any combination. In addition, features such as the particular types of CFA patterns that are used, the configuration of the pixel array, and the readout sequences, may be altered in other embodiments to accommodate the needs of other image capture devices and operating modes. Also, although the illustrative embodiments are configured for progressive scanning of the pixel array, these arrangements may be adapted in a straightforward manner to implement interlaced scanning of the pixel array. These and other alternative embodiments will be readily apparent to those skilled in the art.

PARTS LIST 100 digital camera
102 imaging stage
104 image sensor
106 processor
108 memory
110 display
112 input/output (I/O) elements
200 pixel array
202 photosensitive element
210 horizontal CCD (HCCD)
212 output amplifier
400 vertical CCD (VCCD)
402 transition region
410 vertical shift element
412 first phase vertical shift element
414 second phase vertical shift element
420 transition region shift element
422 first phase horizontal shift element
424 second phase horizontal shift element
426 overflow drain
428 overflow channel

The invention claimed is:

1. A charge-coupled device (CCD) image sensor, comprising:
a plurality of photosensitive elements arranged in rows and columns;
a plurality of vertical CCDs each having vertical shift elements associated with respective ones of the photosensitive elements of a corresponding one of the columns, wherein the vertical CCDs each include a signal channel that transfers charge packets within the respective vertical CCD;
a horizontal CCD comprising horizontal shift elements;
a transition region arranged between the plurality of vertical CCDs and the horizontal CCD, the transition region comprising first, second and third rows of transition region shift elements with each row of transition region shift elements including gates, wherein the signal channels in the vertical CCDs are separated into first and second parallel signal channels and a plurality of shift elements in the first row of transition region shift elements receive and store charge packets from two adjacent columns of vertical CCDs in respective ones of the first and second parallel signal channels and wherein a plurality of shift elements in the second row of transition region shift elements receive charge packets from the first row of transition region shift elements and are each configured to store two different charge packets in respective ones of the first and second parallel signal channels;
a first common control line controlling a portion of the gates in the first row of transition region shift elements and a portion of the gates in the third row of transition region shift elements;
a second common control line controlling a remaining portion of the gates in the first row of transition region shift elements and a remaining portion of the gates in the third row of transition region shift elements; and
a third control line controlling the gates in the second row of transition region shift elements, wherein signals applied to the first, second, and third control lines controllably direct selected ones of the parallel signal channels to the horizontal shift elements of the horizontal CCD in accordance with a designated readout sequence.

2. The image sensor of claim 1 wherein a plurality of shift elements in the third row of transition region shift elements receive charge packets from the second row of transition region shift elements and direct the charge packets from the second row of transition region shift elements into corresponding ones of the horizontal shift elements of the horizontal CCD.

3. The image sensor of claim 1 wherein the vertical CCDs comprise two-phase vertical CCDs and each vertical shift element comprises a first phase vertical shift element and a second phase vertical shift element.

4. The image sensor of claim 3 wherein the shift elements in the second row of transition region shift elements comprise elongated transition region shift elements wherein a given one of the elongated transition region shift elements has approximately the same charge holding capacity as a pair of the first and second phase vertical shift elements of the vertical CCD.

5. The image sensor of claim 4 wherein the first phase vertical shift elements and the elongated transition region shift elements are each controlled by the third control line.

6. The image sensor of claim 1 wherein the separation of the signal channels provided by the vertical CCDs into first and second parallel signal channels in the transition region permits vertical binning of same-color charge packets generated by respective ones of the photosensitive elements.

7. The image sensor of claim 1 wherein the photosensitive elements are configured in accordance with a Bayer color filter array pattern.

8. The image sensor of claim 7 wherein the first and second parallel signal channels of the transition region corresponding to a first one of the vertical CCDs are configured to provide vertical binning of charge packets for pairs of green pixels of a first one of the columns and vertical binning of charge packets for pairs of blue pixels of that same column.

9. The image sensor of claim 8 wherein the first and second parallel signal channels of the transition region corresponding to a second one of the vertical CCDs are configured to provide vertical binning of charge packets for pairs of green pixels of a second one of the columns and vertical binning of charge packets for pairs of red pixels of that same column.

10. The image sensor of claim 1 wherein the photosensitive elements are configured in accordance with a sparse color filter array pattern.

11. A method of reading out a charge-coupled device (CCD) image sensor, the image sensor comprising a plurality of photosensitive elements arranged in rows and columns, a plurality of vertical CCDs each having vertical shift elements associated with respective ones of the photosensitive elements of a corresponding one of the columns, and a horizontal CCD comprising horizontal shift elements, the method comprising the steps of:
providing a transition region arranged between the plurality of vertical CCDs and the horizontal CCD, wherein the transition region comprises first, second and third rows of transition region shift elements and at least a subset of the transition region shift elements in the second row are each configured to store two different charge packets generated by respective photosensitive elements in a single one of the columns;

separating each of a plurality of signal channels provided by respective ones of the vertical CCDs into first and second parallel signal channels in the transition region;

controllably directing charge packets from two adjacent columns of vertical CCDs in respective ones of the first and second parallel signal channels to a plurality of shift elements in the first row of transition region shift elements;

controllably directing charge packets from respective ones of the first and second parallel signal channels in the plurality of shift elements in the first row of transition region shift elements to a plurality of shift elements in the second row of transition region shift elements; and controllably directing selected ones of the first and second parallel signal channels through the third row of transition region shift elements to the horizontal shift elements of the horizontal CCD in accordance with a designated readout sequence.

12. The method of claim 11 wherein the separating and controllably directing steps provide vertical binning of same-color charge packets generated by respective ones of the photosensitive elements.

13. The method of claim 11 wherein the photosensitive elements are configured in accordance with a Bayer color filter array pattern, wherein the first and second parallel signal channels of the transition region corresponding to a first one of the vertical CCDs are configured to provide vertical binning of charge packets for pairs of green pixels of a first one of the columns and vertical binning of charge packets for pairs of blue pixels of that same column, and wherein the first and second parallel signal channels of the transition region corresponding to a second one of the vertical CCDs are configured to provide vertical binning of charge packets for pairs of green pixels of a second one of the columns and vertical binning of charge packets for pairs of red pixels of that same column.

14. A digital imaging device comprising:

a charge-coupled device (CCD) image sensor; and one or more processing elements configured to process outputs of the image sensor to generate a digital image;

wherein said image sensor comprises:

a plurality of photosensitive elements arranged in rows and columns;

a plurality of vertical CCDs each having vertical shift elements associated with respective ones of the photosensitive elements of a corresponding one of the columns, wherein the vertical CCDs each include a signal channel that transfers charge packets within the respective vertical CCD;

a horizontal CCD comprising horizontal shift elements;

a transition region arranged between the plurality of vertical CCDs and the horizontal CCD, the transition region comprising first, second and third rows of transition region shift elements with each row of transition region shift elements including gates, wherein the signal channels in the vertical CCDs are separated into first and second parallel signal channels and a plurality of shift elements in the first row of transition region shift elements receive and store charge packets from two adjacent columns of vertical CCDs in respective ones of the first and second parallel signal channels and wherein a plurality of shift elements in the second row of transition region shift elements receive charge packets from the first row of transition region shift elements and are each configured to store two different charge packets in respective ones of the first and second parallel signal channels;

a first common control line controlling a portion of the gates in the first row of transition region shift elements and a portion of the gates in the third row of transition region shift elements;

a second common control line controlling a remaining portion of the gates in the first row of transition region shift elements and a remaining portion of the gates in the third row of transition region shift elements; and a third control line controlling the gates in the second row of transition region shift elements, wherein signals applied to the first, second, and third control lines controllably direct selected ones of the parallel signal channels to the horizontal shift elements of the horizontal CCD in accordance with a designated readout sequence.

15. The digital imaging device of claim 14 wherein said digital imaging device comprises a digital camera.

* * * * *